United States Patent [19]
Hetico et al.

[11] Patent Number: 5,400,952
[45] Date of Patent: Mar. 28, 1995

[54] METHOD AND APPARATUS FOR DAMPING A BRUSH SEAL

[75] Inventors: Rolf R. Hetico, Cincinnati, Ohio; Stephen M. Bishop, Fort Wayne, Ind.; Larry W. Plemmons, Fairfield; Eugene W. Kreimer, Cincinnati, both of Ohio

[73] Assignee: General Electric Company, Cincinnati, Ohio

[21] Appl. No.: 142,560

[22] Filed: Oct. 25, 1993

[51] Int. Cl.⁶ .................... F16J 15/447; B23K 31/02
[52] U.S. Cl. ........................... 228/185; 228/177; 228/193; 228/215; 29/888.3; 415/174.2; 277/53
[58] Field of Search ............. 228/118, 177, 185, 193, 228/215; 29/888.3; 415/174.2, 173.1, 173.7; 277/53, 192; 300/21

[56] References Cited

U.S. PATENT DOCUMENTS 5,114,159 5/1992 Baird et al. ..................... 277/53

FOREIGN PATENT DOCUMENTS 2250790A 6/1992 United Kingdom .

*Primary Examiner*—Samuel M. Heinrich
*Attorney, Agent, or Firm*—Jerome C. Squillaro; Nathan D. Herkamp

[57] ABSTRACT

There is provided by the present invention method and apparatus for damping vibrations or other unwanted motions of a brush seal, the apparatus including a damper having a plurality of individual plates that are bonded directly to the inlet rows of bristles of the seal. Methods for producing a damped brush seal in accord with the present invention contemplate brazing damping plates to the bristles, absorbing a melting point suppressor into the surface of the damping plates and then heating the damping plates until the treated surface melts and bonds with the bristles, or sintering a braze alloy to the bristles such that the braze alloy functions as a damping plate.

9 Claims, 2 Drawing Sheets

METHOD AND APPARATUS FOR DAMPING A BRUSH SEAL

FIELD OF THE INVENTION

The present invention relates to a method and apparatus for damping the bristles of a brush seal.

BACKGROUND OF THE PRESENT INVENTION

A turbofan gas turbine engine operates according to well known principles wherein an incoming air stream flows through the engine along an annularly configured, axially extending flow path. A portion of the incoming air stream is compressed in a compressor section of the engine and then mixed with fuel and burned in a combustor section to produce a high energy, high temperature exhaust gas stream. The gas stream exits the combustor and subsequently passes through a turbine section that extracts energy from the exhaust gas stream to power the compressor and produce bypass thrust by rotating a fan that acts generally on the remaining portion of the incoming air stream.

Uncontrolled leakage of gases within the engine contributes to reduced engine efficiency. Seals are used to control this energy loss by interposing them in a leakage path to reduce the volume or mass of the gas—atmospheric air, exhaust, or otherwise—passing from one part of the engine to the other. In the past engine seals have principally taken the form of labyrinth seals. The use of brush seals as a substitute for labyrinth seals is presently being investigated.

In general, brush seals are used to seal a leakage path between a pair of relatively movable members. A typical use for such seals in a gas turbine engine is where the seal will be placed in a leakage path between a stationary engine member and a rotating engine member, such as a shaft, to control the loss of air through the leakage path between the members. Brush seals are not intended to function so as to completely seal one engine section from another, but rather rely upon the torturous flow path created between the bristles to reduce the airflow from one part of the engine to another and to control the pressure drop between the engine parts.

Brush seals used in gas turbine engines comprise, in general, single or multiple seal stages with each stage including an annularly configured upstream, or high pressure, plate and an annularly configured downstream, or low pressure, plate. Together the plates sandwich therebetween an annular array of bristles known collectively as a bristle pack. Usually the bristles are disposed at about a forty-five degree angle to a radius drawn from the engine center line. The bristles are usually affixed at their radially outer end with their radially inner ends extending across into the leakage path between the engine members. The radially inner free ends of the bristles sealingly engage a sealing surface on the radially inner engine member, which is typically the rotating engine member.

Because the bristles are somewhat flexible, they are able to bend during an engine transient and still retain their sealing ability after the transient has passed. Examples of such transients include differential thermal growth between the engine parts, rotor/stator relative movement, and vibration of some sort. Thus, a rotating engine shaft, for example, may enter a vibration mode where the shaft is vibrating about its longitudinal axis, that is, when the shaft is rotating eccentrically. The leakage path that is sealed by the brush seal is defined by the annular gap between the downstream plate and the rotating member. This gap is made as small as possible, though not as small as desirable for sealing purposes, since the gap exists to accommodate the aforementioned engine transients.

The sealing efficiency of a brush seal over time is affected by the wear on the bristle ends contacting the sealing surface on the opposing engine part, as well as the overall contact of the bristle ends with the sealing surface. Worn bristles ends will dictate replacement of the seal or particular seal stage earlier than otherwise would be necessary, thereby increasing engine operating costs. Because the bristles are not directed along true radii to the engine center line, but rather are angled at about forty-five degrees relative thereto, excessive, irregular wear of the bristles may result from an adversary gas flow field, that is, a gas flow field that includes substantial velocity vectors disposed at angles other than perpendicularly to the seal. This adversary flow field can reduce the compactness of the bristle pack, which permits the individual bristles of the bristle pack to move randomly with a higher degree of freedom than the bristles of a seal not encountering such an adversary flow. When the bristles are tightly packed, they wear better over time and seal more efficiently. This enlarged freedom of bristle movement from the adversary flow field results in the bristles being displaced and rubbing, which in turn creates bristle wear.

Stated otherwise, any gas that encounters the seal that has a swirl, recirculation, or turbulence associated therewith will move the bristle ends and will contribute to unwanted bristle wear, often called tufting when originating from these causes. In common parlance, swirl is a rotational movement of the fluid molecules; recirculation is a radial movement of the fluid molecules; and turbulence is random, volatile movements of the fluid molecules. Thus, a radially outwardly directed recirculation, for example, can lift the bristles, which are usually attached at their radially outer but not their radially inner ends, thereby fluffing them and reducing their density. Additionally, an upstream jet flow, which forms part of the gas adversary flow, will vibrate the loosely packed or fluffed bristles and may open a small gap between the bristle ends and the sealing surface such that air can freely pass by an upstream seal stage and encounter a downstream seal stage with great velocity. This, in turn, will cause irregular wear on the downstream seal stage and may open a leakage gap at the adjacent downstream stage also, again allowing free passage of air or gas and greatly reducing engine efficiency. The lifetime and sealing efficiency of a brush seal are dependent in part on the chamfering of the bristle pack on the upstream side of the pack and wear of the bristles. This chamfering and wear facilitates movement of air through the bristle pack as well as blow-by conditions where a gap is opened between the bristle ends and the sealing surface on the rotating engine member.

Eccentric rotation of a rotor shaft can create unwanted bristle wear. Eccentric shaft rotation has been found to induce a one per revolution unsteady flow with respect to the stationary bristles. The unsteady flow causes the bristles to move as cantilever beams with the free ends of the bristles deflecting radially, tangentially, and axially. Radial deflection of the free ends increases the rubbing force between the free ends of the bristles and the sealing surface, thereby causing the free ends to wear. Because the amplitude of the induced vibration decreases axially from the inlet or upstream side of the seal to the outlet or downstream side of the seal, the upstream bristle free ends experience wear to a greater extent than the downstream free ends. Thus, the bristle pack is chamfered by the one per revolution induced excitation of the bristles.

To control bristle wear, it has been proposed to use dampers on the inlet face of the brush seal. Inlet dampers operate well to control bristle wear, but they are difficult to manufacture. To be effective, the dampers must engage the bristles with enough force to damp their vibrations, but must not engage them too tightly or the bristles can overheat during engine operation and even melt as a result of the overheating. In addition, any variations in the manufacturing process can lead to uneven damping of the bristle pack, thereby causing differential wear of the bristles forming the bristle pack.

It would be desirable to increase the lifetime and sealing efficiency of brush seals by reducing chamfering and wear of the bristle pack, by reducing seal damper manufacturing variations, and by manufacturing a damper that produces more uniform damping characteristics.

SUMMARY OF THE INVENTION

There is provided by the present invention a method and apparatus for damping a brush seal. A brush seal according to the present invention includes upstream and downstream, or inlet and outlet, respectively, seal plates that sandwich therebetween a bristle pack formed of a multiplicity of bristles. The bristle pack is damped by substantially connecting the inlet row of bristles to each other. The connection can be made by brazing a damping plate directly to the bristles; by disposing a melting point suppressor on the surface of the damping plate and then heating the damping plate while holding the plate against the bristles so that the melted plate surface forms a bond with the bristles; or by sintering a brazing alloy directly to the bristles. A brush seal formed according to one of the foregoing methods thus includes an inlet or upstream row of bristles that act as the damper for the bristle pack, thereby reducing chamfering and bristle wear.

The foregoing invention and its advantages over the prior art will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

While gas turbine engines are well known in the art, a brief description of the operation of such an engine will enhance appreciation of the interrelationship of the various components by way of background for the invention to be described below. Furthermore, while many different types of gas turbine engines exist, the present invention will be described in relation to its application to a particular type, it being recognized, of course, that the present invention could equally well be utilized in other types of gas turbine engines.

Figure 1:
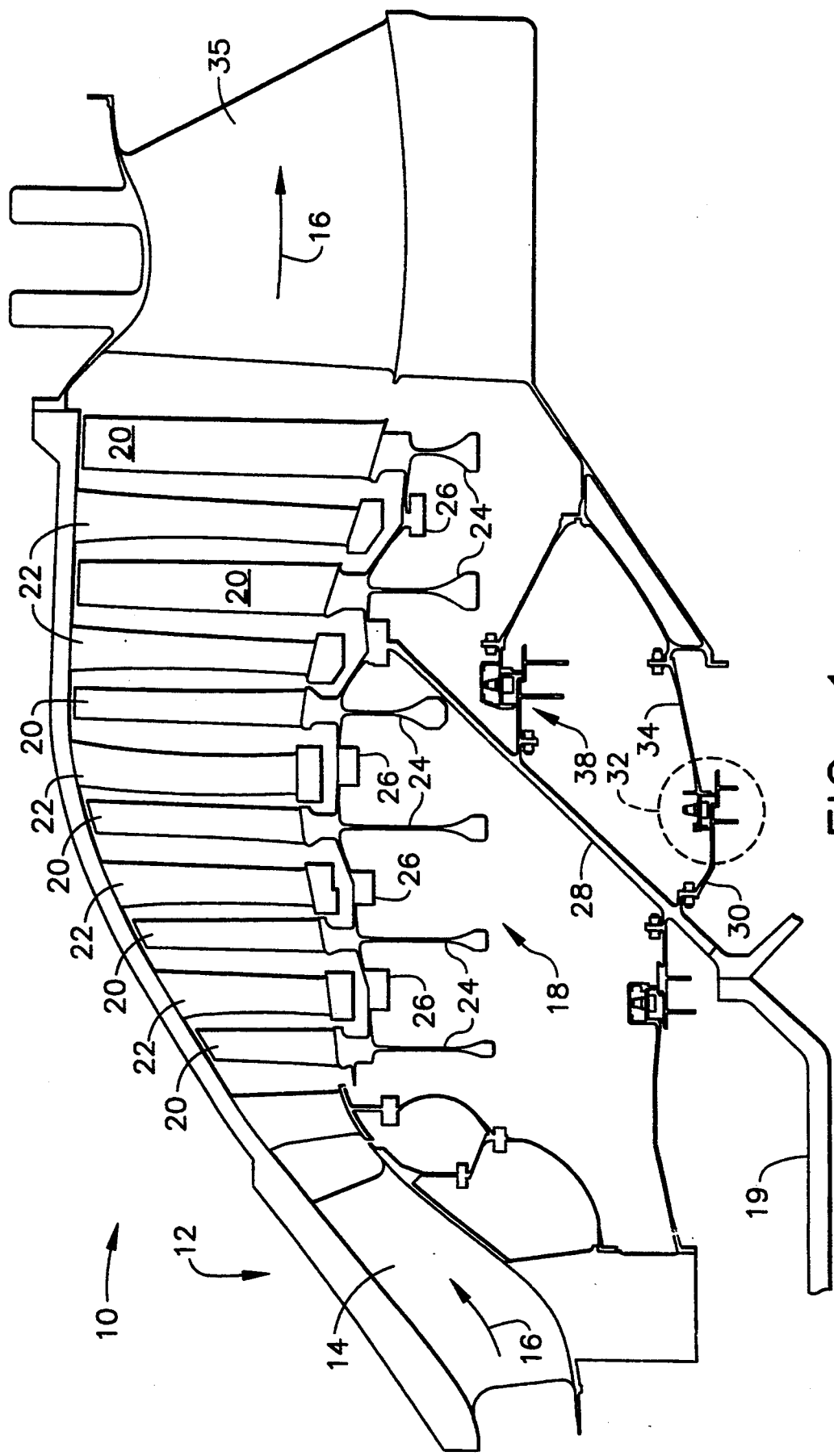
FIG. 1 shows a partial cross section of a gas turbine engine and illustrates a typical installation location for a brush seal according to the present invention.

Thus, there is depicted in FIG. 1 a partial cross sectional view of a gas turbine engine 10 including a turbine section 12. Engine 10 defines an annular flow path extending from an engine air inlet (not shown) to an engine exhaust nozzle and comprises a gas generator effective for producing a high energy gas stream and a turbine for extracting energy from the gas stream to provide thrust. The gas generator includes in an axial flow arrangement a compressor for compressing air flowing into engine 10, a combustor where fuel is mixed with the compressed air stream and ignited, thereby producing the high energy gas stream, and the turbine section 12 for extracting a portion of the energy of the gas stream to drive the compressor and to produce bypass thrust.

Turbine section 12 has an air flow path 14 through which a high energy gas stream from the upstream portion of the engine flows downstream, as indicated by arrow 16. Turbine section 12 extracts energy from the high energy gas stream for propulsion by means of a low pressure turbine 18. The low pressure turbine 18 in turn drives a forwardly disposed fan that produces bypass thrust. The fan is driven through a shaft 19 that extends between the fan and the turbine 18. The fan is driven by rotation of one or more rows 20 of turbine blades, which are interdigitated with one or more rows of turbine stators 22. The rotation of the turbine is induced by the passage of the high energy gas stream.

Each row 20 of turbine blades comprises a plurality of individual blades circumferentially mounted to a turbine disk 24. The disks 24 are in turn rigidly connected for uniform rotation by appropriate connecting members 26 known to the art. A turbine shaft cone 28 extends between the interconnected turbine disks 24 and the shaft 19. Turbine shaft cone 28 rotates as does the downstream extending rotating seal portion 30.

Dashed circle 32 indicates a location where a brush seal in accord with the present invention could be disposed within engine 10. Such a brush seal or a plurality of seals would be disposed between the rotating seal portion 30 and a stationary member 34, which as shown is rigidly affixed to a turbine rear frame 35. A second potential location for one or more brush seals in accord with the present invention is indicated with reference numeral 38; this seal also extends between the turbine shaft cone 28 and the turbine rear frame 35 but at a different location as shown.

Figure 2:
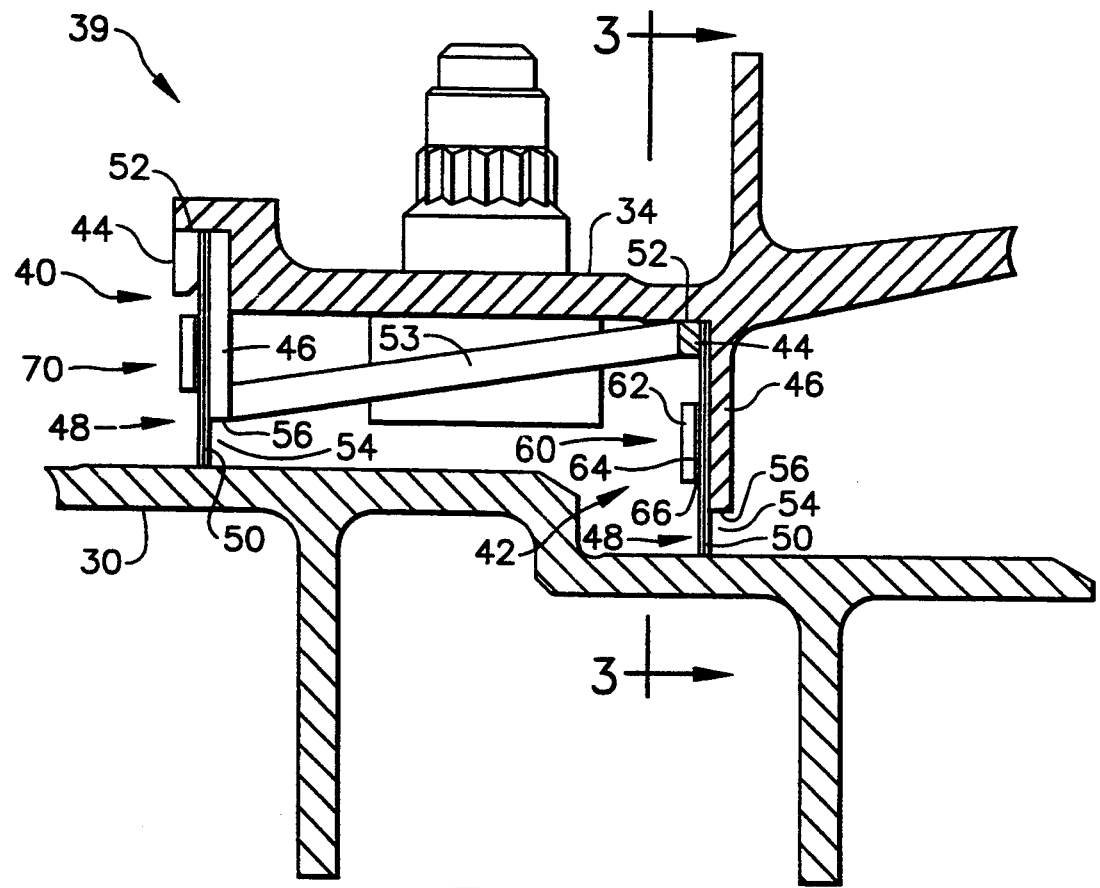
FIG. 2 shows in greater detail the brush seals shown in FIG. 1.

Referring now to FIG. 2, apparatus in accord with the present invention will be described, as will a method of manufacturing the same. FIG. 2 shows a two stage brush seal 39 comprising a pair of brush seal stages 40 and 42 extending between rotating seal portion 30 and stationary member or brush seal housing 34. Each seal stage 40, 42 includes an upstream or inlet plate 44, a downstream or outlet plate 46, and a bristle pack 48 comprising a plurality of bristles 50 sandwiched between the inlet and outlet plates 44 and 46 respectively. Each seal stage 40, 42 is attached at its radially outward, circumferentially extending side 52 to housing 34. Also shown in FIG. 2 is an arm 53 that extends from the radially outer end of the outlet plate 46 of seal stage 40 to the radially inner end of the inlet plate 44 of the downstream stage 42.

Bristles 50 extend across a clearance gap 54 that extends between rotating seal portion 30 and the radially inner surface 56 of the outlet plate 46. Clearance gap 54 is sized to be as small as possible but must be present to account for differences in thermal growth and maneuver deflections of the various engine parts and for eccentric rotation of rotating engine parts. Shaft 19, to which seal portion 30 is attached, is such a rotating engine part. Failure to provide a clearance gap of sufficient dimensions could create undesirable rubbing between rotating seal portion 30 and downstream plate 46.

Figure 3:
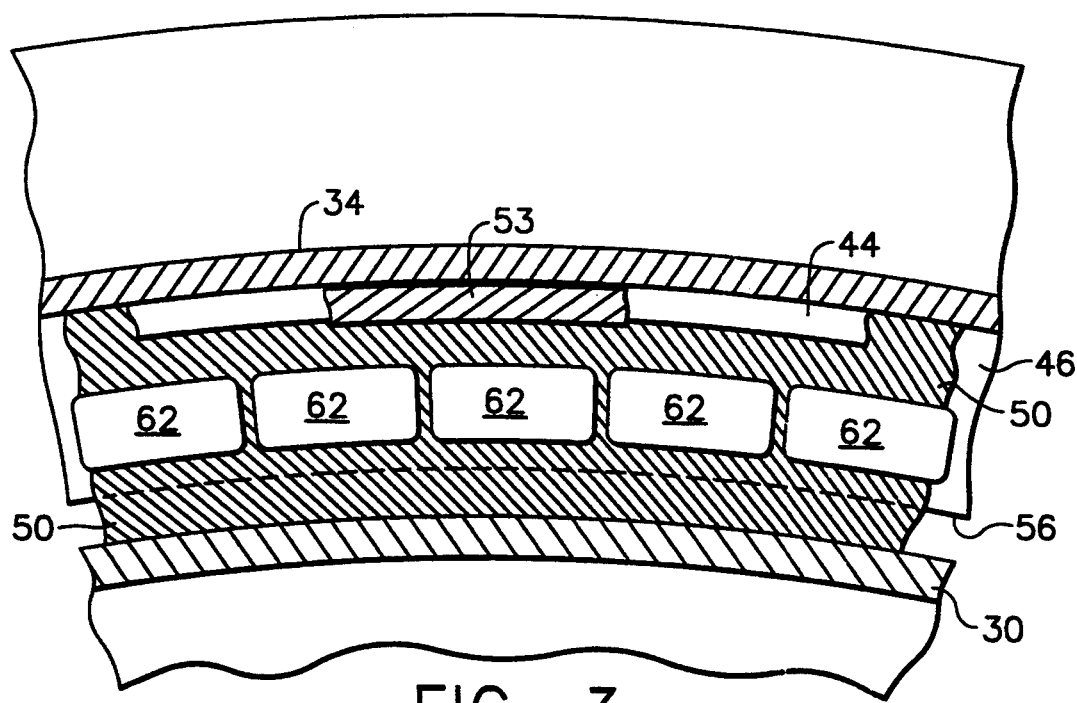
FIG. 3 is a front elevation view of the brush seal and apparatus shown in FIG. 2 taken along cutting plane 3—3 thereof.

Referring to FIGS. 2 and 3 and specifically to brush seal 42 now, it will be seen that a damper 60 is disposed against the upstream or inlet face of the bristle pack 48, thereby engaging the inlet side of the most upstream bristles of bristle pack 48. Damper 60 comprises a plurality of individual damping plates 62, best seen in FIG. 3, each having a rectangular configuration and a thickness less than the height or width thereof.

Each damping plate 62 may be attached to the bristles by brazing the plate thereto using known brazing compounds and techniques, thereby producing a bond joint 64. As part of the process of brazing the damping plate to the bristles the bristle pack is usually painted with a liquid, commonly called a "stop off" or braze inhibitor, that prevents the braze alloy from adhering to any bristles except the inlet or upstream layer of bristles. Such liquids are well known, with each manufacturer of brazing materials generally providing its own such braze inhibitor. The braze inhibitor is usually applied to the bristle pack with a paint brush, with a capillary action pulling the liquid into the bristle pack. By attaching the damping plates 62 directly and rigidly to the inlet side of the bristle pack, the engaged bristles of the inlet row of the bristle pack 48 act as a damping mechanism. This produces more uniform damping characteristics on the brush seal bristle pack and results furthermore in a reduction of the effects that manufacturing variations can have in the production of known dampers. Using the inlet row of bristles as the damper creates and maintains a more uniform damper load as well as a load that stays constantly loaded on the bristle pack 48.

Alternatively to brazing the damping plate 62 to the inlet row of bristles, a melting point suppressor, such as boron, could be introduced into the seal facing surface 66 of the plate 62 to create a treated surface. The damping plate 62 would then be placed into a position where the treated surface engaged the inlet side of the bristle pack and would be subsequently heated. Heating of the damping plate would occur until the treated surface melted and bonded to the inlet rows of bristles 50 of the bristle pack 48.

Yet another alternative to manufacturing a brush seal in accord with the present invention is to sinter a braze alloy such as nickel base braze alloy directly onto the inlet rows of bristles 50 of bristle pack 48. This alternative is shown in FIG. 2 where seal stage 40 includes a damper 70 formed by the aforedescribed method.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

What is claimed is:

1. Sealing apparatus for sealing a leakage path between a rotating and a stationary member of a fluid flow machine, said apparatus comprising:
 a brush seal having at least one stage, said stage including a bristle pack sandwiched between upstream and downstreamplates, said bristle pack including a plurality of bristles, said bristles having free ends for sealingly engaging said rotating member; and
 a plurality of damping plates, each said damping plate bearing against said upstream side of said bristle pack, each said plate having a substantially planar configuration, each said damping plate being brazed to said upstream bristles of said bristle pack.

2. The seal of claim 1 wherein said plurality of damping plates are brazed to said bristle pack of said seal so as to form circular damping ring engaging said bristle pack.

3. Sealing apparatus for sealing a leakage path between a rotating and a stationary member of a fluid flow machine, said apparatus comprising:
 a brush seal having at least one stage, said stage including a bristle pack sandwiched between upstream and downstream plates, said bristle pack including a plurality of bristles, said bristles having free ends for sealingly engaging said rotating member, said bristles of said bristle pack disposed on the upstream side of said bristle pack being rigidly joined to form a damping layer for said bristles of said bristle pack for damping unwanted vibrations and movements of said bristles.

4. The apparatus of claim 3 wherein said bristles are rigidly joined by sintering a braze alloy to said upstream side of said bristle pack.

5. A method of manufacturing a damped brush seal, for sealing a leakage path between a rotating and stationary members of a fluid flow machine, said brush seal comprising at least one stage, said stage including a bristle pack and an upstream and a downstream plate sandwiching said bristle pack, said bristle pack having upstream and downstreamsides and having a plurality of bristles, said seal further including means for reducing vibration of said bristles in said bristle pack, said method comprising:
 disposing said bristle pack between said upstream and downstream plates;
 attaching a plurality of damper plates to the upstream side of said bristle pack, said attaching step comprising:
  forming a bristle-to-damping plate bond joint between each said damping plate and said bristle pack.

6. The method of claim 5 wherein said joint forming step comprises:
 brazing each said damping plate to said bristles.

7. The method of claim 5 wherein said method further comprises painting the bristles with a braze inhibitor prior to brazing the damping plate to the bristles.

8. The method of claim 5 wherein said damping plate has a bristle side surface and said joint forming step comprises:
 placing a melting point suppressor on the bristle side surface of said damping plate to form a treated surface;
 placing said damping plate against said bristles such that said treated surface engages said bristles; and
 heating said damping plate until said treated surface melts and bonds to said bristles.

9. A method of manufacturing a damped brush seal, for sealing a leakage path between a rotating and stationary members of a fluid flow machine, said brush seal comprising at least one stage, said stage including a bristle pack and an upstream and a downstream plate sandwiching said bristle pack, said bristle pack having upstream and downstream sides and having a plurality of bristles, said seal further including means for reducing vibration of said bristles in said bristle pack, said method comprising:

disposing said bristle pack between said upstream and downstream plates;

sintering a braze alloy onto said bristles, said alloy forming a damping plate.

* * * * *